April 25, 1967   J. R. HOLLINS   3,316,534
AUTOMOTIVE SIGNALING SYSTEM
Filed Oct. 19, 1964
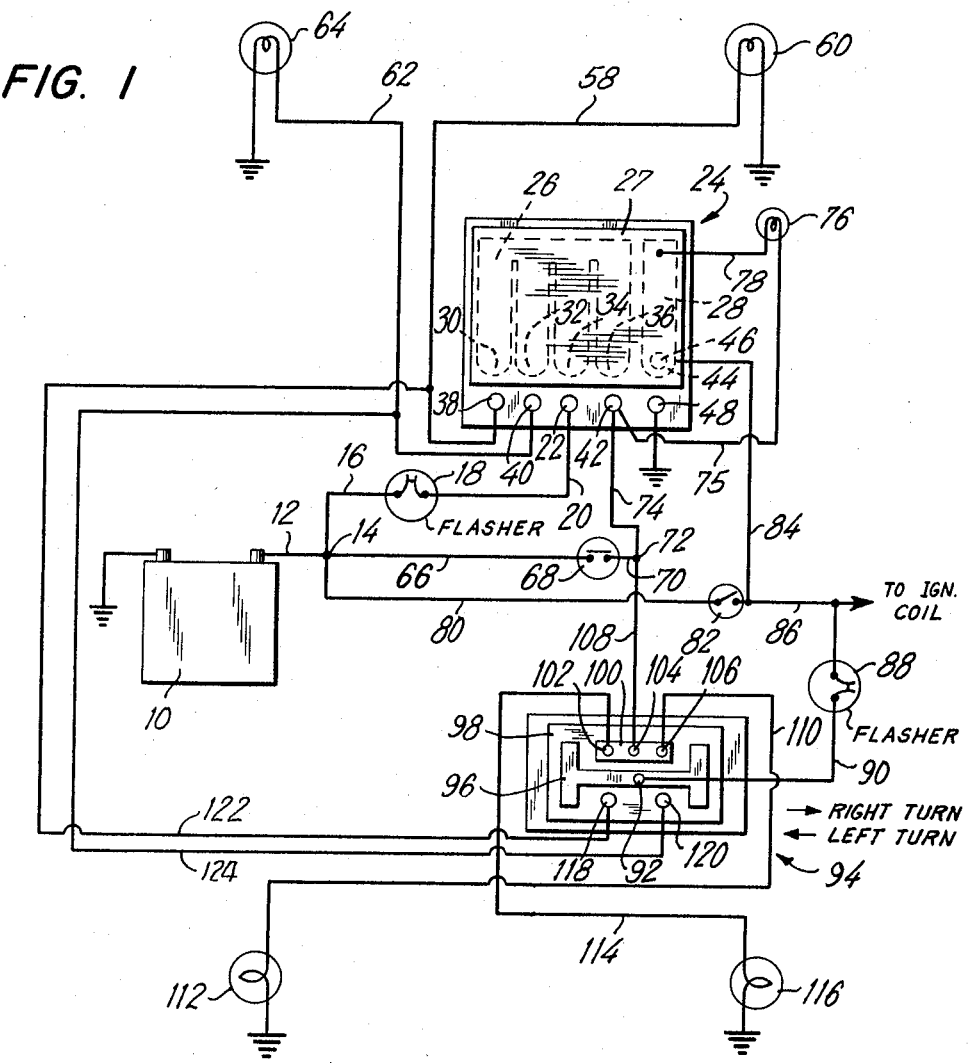
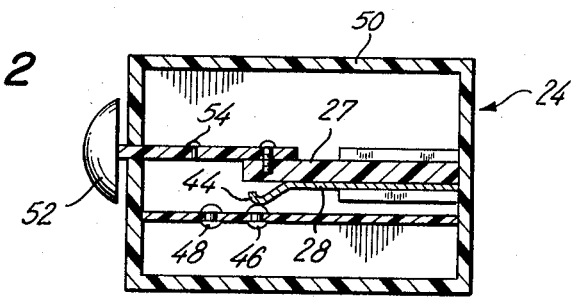
INVENTOR
JESSE R. HOLLINS
BY
ATTORNEYS

United States Patent Office 3,316,534
Patented Apr. 25, 1967

3,316,534
AUTOMOTIVE SIGNALING SYSTEM
Jesse R. Hollins, 1059 E. 22nd St.,
Brooklyn, N.Y. 11210
Filed Oct. 19, 1964, Ser. No. 404,634
5 Claims. (Cl. 340—74)

This invention relates to an automotive signaling system and specifically pertains to an automotive signaling system that incorporates into a single wiring harness a hazard switch for concurrently flashing front and rear signal lamps on both sides of an automobile, a stop light switch and a single indicator lamp for the two switches.

A hazard warning circuit is employed on some vehicles to concurrently flash right and left front signal lamps and rear signal lamps so as to indicate that the vehicle is disabled or obstructing traffic flow. Such a signal is a warning to oncoming or following vehicles to take due caution in approaching the stricken vehicle. The hazard warning circuit is conventionally energized by a manually operable switch accessible within the interior of the vehicle.

A stop light circuit is provided as standard equipment on every modern automobile. The function of such a circuit is to steadily energize right and left rear signal lamps when the driver applies his brakes. The illumination of such lamps indicates to a following automobile that the leading automobile is slowing down or stopping.

It is the primary object of my invention to combine into an improved and simplified unitary automotive signaling system both a hazard warning circuit and a stop light circuit that includes an operating proof indicator.

It is a further object of my invention to provide a unitary automotive signaling system of the character described wherein a single indicator lamp will demonstrate to a driver when his hazard warning system is in operation and that his stop light circuit is in order.

It is another object of my invention to provide an automotive signaling system of the character described that constitutes a minimum of parts, has both circuits integrated into a common wiring harness, is easy and inexpensive to manufacture, is reliable, durable and fool-proof in operation and is readily utilizable with a directional (turn) signal switch.

These and various other objects and advantages of my invention will become apparent to the reader in the following description.

My invention accordingly consists in the features of construction, combination of elements, electric circuit and arrangements of parts which will be exemplified in the system hereinafter described and of which the scope of application will be indicated in the appended claims.

In the accompanying drawings in which is shown one of the possible embodiments of my invention, FIG. 1 is a circuit diagram of an automotive signaling system embodying my invention and showing the hazard switch in its "hazard off" position, the directional switch in its "neutral" position and the stop light switch in its "off" position; and FIG. 2 is a side elevational cross-sectional view of the interior of the hazard switch.

In general, I accomplish the aims of my invention by providing a hazard warning circuit that is adapted to connect the front and rear, right and left signal lamps on the automobile to the battery through a hazard switch. The circuit is such that when the hazard switch is thrown to its "hazard on" position, a flashing energization path is connected from the battery through the hazard switch to all said signal lamps whereby the lamps concurrently flash. I also provide a proof indicator, i.e. an indicator lamp, and circuit means which connects the indicator lamp through the hazard switch, when the switch is in its "hazard on" position, to the aforesaid flashing energization path so that when all of said signaling lamps are flashing, the indicator lamp will be controlled in a first mode, to wit, will manifest to the vehicle operator that the hazard switch is in its "hazard on" position, by flashing.

I further include in my signaling system a stop light switch which is closed by the depression of the brake pedal of the automobile. Circuit means connects the battery through the stop light switch in its "closed" position to both rear signaling lamps so that when the automobile brakes are applied by depression of the brake pedal, the rear signaling lamps will be energized. The last circuit means controls the indicator lamp in a second mode, e.g. a steadily-burning condition, when the hazard switch is in its "hazard off" position and the stop light switch is in its "open" position. The stop light switch is a part of a low resistance shunt path parallel to the indicator lamp so that when the stop light switch is closed, electrical energy is diverted from the indicator lamp due to the higher resistance of its filament and a sufficient flow of current will traverse the rear signaling lamps to light them. Thus, the shunt path constitutes another circuit means that upon closure of the stop light switch, with the hazard switch in "hazard off" position, will control the indicator lamp in a third mode, this being with said lamp extinguished provided that at least one stop light is lit so that change of the indicator lamp from its second to its third mode upon applying the brake pedal shows that the stop light switch and circuit are in working order.

Referring now in detail to the drawings, the reference numeral 10 indicates a source of electric energy, e.g., a standard automotive vehicle 6 or 12-volt storage battery. One terminal of the battery is grounded and the other terminal of said battery is connected by a lead wire 12 to a junction 14. From the junction, a lead wire 16 leads to one side of a conventional flasher 18, the other side of which is connected by a lead wire 20 to the input contact 22 of a hazard switch 24.

The hazard switch is manually operable from the interior of the automobile by the automobile operator and is movable between a "hazard on" and "hazard off" position. In the first-named position of the switch, the front and rear right and left signaling lamps on the automobile concurrently flash.

The hazard switch 24 comprises a shiftable member 26 including four electrically interconnected spring contact fingers, and a spring contact bar 28 insulated from the four finger member 26. Both the four finger member and the contact bar are mounted on a non-conductive plate 27. The tip of each of the fingers of the four finger member 26 comprises a bridging contact, respectively contacts 30, 32, 34 and 36. When the hazard switch is in its "hazard on" position, the bridging contact 34 on the four finger member 26 engages the input contact 22 while the other bridging contacts on the four finger member engage output contacts, that is, bridging contact 30 engages an output contact 38, bridging contact 32 engages an output contact 40, and bridging contact 36 engages an output contact 42. In the "hazard off" position, all of the bridging contacts 30, 32, 34 and 36 on the four finger member break with their affiliated output contacts, respectively contacts 38, 40, 22 and 42.

The spring contact bar 28 also has an end which constitutes a contact 44. When the hazard switch is in the "hazard off" position, this contact engages an input contact 46 and when the hazard switch is in its "hazard on" position said contact 44 engages a ground contact 48.

FIG. 2 is a side elevational cross-sectional view of the hazard switch 24 and illustrates a housing 50 for the hazard switch and a knob 52 for the hazard switch by which the switch is movable between its "hazard off" and "hazard on" positions. A shaft 54 connected to the knob 52 is fast to the insulating plate 27. The contact bar 28 is secured to the insulating plate 27 and the contact 44 is in the form of a depending spring foot. The input contact 46 and the ground contact 48 are insulated from one another and are mounted in the path of travel of the contact 44. In its rearward "hazard off" position, the contact bar through the contact 44 engages the input contact 46 and in its forward "hazard on" position the contact 44 engages the ground contact 48.

The output contact 38 is connected by a lead wire 58 to one terminal of a right front signaling lamp 60, the other terminal of which leads to ground. The output contact 40 is connected by a lead wire 62 to one terminal of the left front signaling lamp 64, the other terminal of which leads to ground.

A lead wire 66 leads from the junction 14 to one side of a stop light switch 68. The stop light switch is normally open and is physically connected to the brake pedal of the automotive vehicle so that when the brake pedal is depressed, the stop light switch is closed. A lead wire 70 connects the other side of the stop light switch 68 to a junction 72. From the junction 72 a lead wire 74 runs to the output contact 42. Another lead wire 75 runs from the contact 42 to an indicator lamp 76, and the indicator lamp is connected by a lead wire 78 to the contact bar 28.

From the junction 14 a lead wire 80 runs to one side of a conventional automotive ignition switch 82. As is standard, the ignition switch 82 is of the key operated type and is rendered movable between an "open" position and a "closed" position as by the insertion and then rotation of a mating key. From the other side of the ignition switch 82 a lead wire 84 runs to the input contact 46. Also, from the same side of the ignition switch a lead wire 86 runs to the ignition coil of the automobile. Said lead wire 86 also runs to one side of a conventional flasher 88. From the other side of the flasher a lead wire 90 runs to a central input contact 92 of a directional signal switch 94. Central contact 92 slidably engages a conductive connector link 96 which is secured to an insulating shiftable plate 98. Also secured to the insulating plate 98 is a conductive bridge 100. The insulating plate is shifted in a conventional manner by a turn selector lever (not shown) conventionally mounted on the steering column of the automobile.

The directional signal switch 94 includes three stationary contacts, an output contact 102, an input contact 104 and an output contact 106. The input contact 104 is connected by a lead wire 108 to the junction 72. The output contact 106 is connected by a lead wire 110 to one terminal of a left rear signaling lamp 112, the other terminal of which runs to ground. The other output contact 102 is connected by a lead wire 114 to one terminal of a right rear signaling lamp 116 the other contact of which runs to ground. The directional signal switch 94 further includes two stationary output contacts, contacts 118 and 120. Contact 118 is connected by a lead wire 122 to the lead wire 58 and the contact 120 is connected by a lead wire 124 to the lead line 62.

The directional signal switch 94 is movable from a "neutral" position in which no turn is signaled to a "left turn" or "right turn" position, i.e., a position in which a left turn is signaled by the left front and rear signaling lamps or a position in which a right turn is signaled by the right front and rear signaling lamps. In the "neutral" position of said switch, the bridge 100 interconnects the contacts 102, 104 and 106. When a left turn is signaled by the directional switch by proper manipulation of the selector lever, the insulating plate 98 is moved to one side (to the left in FIG. 1) so that the bridge 100 also shifts to the left, breaks from the output contact 106, and interconnects only the output contact 102 and the input contact 104. Simultaneously therewith, the connector link 96 shifts to the left and engages output contacts 106 and 120. When the operator signals a right turn, the insulating plate 98 shifts and the bridge 100 in a similar manner breaks from output contact 102 and interconnects only input contact 104 to the output contact 106. The connector link 96 at this time also shifts to the right and engages output contacts 102 and 118.

Turning to the operation of my automotive signaling system, first circuit means is provided in connection with the electrical hardware previously described so that when the hazard switch is placed into its "hazard on" position by an operator of the vehicle, the right and left, front and rear signaling lamps concurrently flash. To this end, when the hazard switch is in said "on" position an energizing path is closed from the battery 10 through the lead wire 12, the lead wire 16, the flasher 18, and the lead wire 20 to the input contact 22.

Recalling that in the "hazard on" position each of the bridging contacts which comprise the tips of the fingers of the four finger member 26 engages its respective output contact, the energizing path continues to each of the lamps 60, 64, 112 and 116. Specifically, the energizing path continues from bridging contact 34 through the four finger member 26 and then through output contact 38 and lead wire 58 to the right front signal lamp 60; through the output contact 40 and the lead wire 62 to the left front signaling lamp 64; through the output contact 42, lead wire 74 and lead wire 108 to central input contact 104, through the bridge 100 to, respectively, the output contact 102 and lead wire 114 to the right rear signaling lamp 116 and output contact 106 and lead wire 110 to the left rear signaling lamp 112.

The flasher 18 provides an intermittent impulse along said energizing circuit so that when the hazard switch is in its "hazard on" position the right and left, front and rear signaling lamps will flash.

It may be noted parenthetically that the foregoing energizing circuit does not traverse the ignition switch 82 so that all the signaling lamps on the automobile may desirably be caused to flash even when an operator of the vehicle opens his ignition switch, leaves his automobile and locks the doors of the automobile.

Said first circuit means includes means to cause the indicator lamp 76 to emit a distinctive signal in a first mode when the hazard switch is in its "hazard on" position. For this I provide an energizing path from the battery 10 through the lead wire 12, the lead wire 16, the flasher 18, the lead wire 20, the input contact 22, the bridging contact 34 and the four finger member 26 which in this position of the hazard switch connects the contact 22 to the output contact 42, the lead wire 74, the lead wire 75, the indicator lamp 76, the lead wire 78, the contact bar 28 including the output contact 44 to the grounded contact 48. Since this energizing path passes through flasher 18 and is operable only when the hazard switch 24 is in its "hazard on" position, the indicator lamp 76 will flash to indicate that the hazard switch 24 is in such position.

Second circuit means is provided to cause the indicator lamp 76 to emit a signal in a second mode different from the first named signal mode to indicate, when the hazard switch is in "hazard off" position, that at least one of his rear signal lamps is operable but not illuminated. This latter signal also indicates that the stop light switch 68 is in its open position. Said second circuit means includes an energizing path from the battery 10, through the lead wire 12, the lead wire 80, the ignition switch 82 (when closed), the lead wire 84, the contact 46, the contact 44 on contact bar 28, the lead wire 78, the indicator lamp 76, the lead wire 75, the contact 42, the lead wire 74, the lead wire 108, the central input contact 104, the bridge 100 and (when the directional signal switch is in "neutral" position) along the lead wire 114 to the right rear signaling lamp 116 and the lead wire 110 to the left rear signaling lamp 112. The resistance of the filament of the indicator lamp 76 is higher than the low resistances of the filaments of the rear signaling lamps 112, 116, so that electrical energy passing through said path causes the indicator lamp 76 to burn steadily with the rear signaling lamps unlit. Since the second circuit means is closed only when at least one of the rear lamps completes said energizing path, steady burning of the indicator lamp shows that at least one rear light is operable. Because the ignition switch 82 is also in said energizing path, the indicator lamp 76 will only yield a steady signal when the ignition switch is closed. If the ignition switch is open, the indicator lamp will be unlit.

So far in the operational description of my automotive circuit, there are two distinct signals exhibited by the indicator lamp. First, a flashing signal manifests that the hazard switch is in "hazard on" position and, second, a steady signal manifests that at least one rear signal lamp is operable but not illuminated, the latter signal taking place only when the ignition switch is "on" and the hazard switch is in "hazard off" position.

The second circuit means further includes a shunt path parallel to and spanning the indicator lamp 76. Said shunt path runs from the junction 14, through the lead wire 66, the normally-open stop light switch 68, and the lead wire 70 to the junction 72. When the stop light switch 68 is closed by the depression of the brake pedal by the operator of the vehicle, the shunt path is closed and electrical energy will pass from the battery 10 through said shunt path to the lead wire 108 to the central input contact 104 and then in parallel to both of the rear signaling lamps 112, 116, thus bypassing the indicator lamp 76 which thereupon is extinguished while due to the shunting of the high resistance lamp 60, the heavier current flow will illuminate the lamps 112, 116.

Thus an operator of the vehicle when stepping on his brake pedal (with the ignition switch "on" and with the hazard switch 24 in its "hazard off" position), should observe simultaneously with his foot movement the extinguishment of the indicator lamp 76. This change from a steady burning condition to a non-illuminated condition indicates that the stop light switch has closed the shunt path and that at least one of the rear signaling lamps (since these lamps are connected in parallel) is now burning.

If the indicator lamp 76 remains on after the brake pedal is depressed, this demonstrates that the stop light switch 68 has not closed the shunt path and that no stop lights are lit. If the indicator lamp remains extinguished after the brake pedal is released, this would show that the stoplight switch has not opened and the stoplights are still burning. In any case, upon any of the described abnormal occurrences, a malfunction in the automotive wiring circuit is evident.

Third circuit means is provided in connection with the directional signal switch 94 to enable an operator of the vehicle to determine whether any specific one of his rear signaling lamps is no longer operative. When the directional signal switch 94 is in its central or "neutral" position (and with the hazard switch 24 in its "hazard off" position and the ignition switch closed) there is a closed energization path to the rear signaling lamps 112, 116, but neither of said lamps is illuminated due to the high resistance of the indicator lamp filament. When it is desired to signal a right turn by flashing the right signaling lamps 60, 116, the insulating plate 98 is shifted by the turn selector to the right thereby completing a flashing energization path from the battery 10 directly to the desired signaling lamps, and circumventing the indicator lamp 76. Said path runs from the battery 10 through the lead wire 12, the lead wire 80, across the ignition switch 82 in its "on" position, the lead wire 86 through the flasher 88 and the lead wire 90 to the central input contact 92. Shifting of the insulating plate 98 to the right causes the connector link 96 to engage the contact 102 and create a path through the lead wire 114 to the right rear signaling lamp 116. Since the aforesaid energization path has passed through the flasher 88, a flashing impulse is transmitted to the right rear signaling lamp 116. Simultaneously therewith, the connector link 96 engages the output contact 118, thereby being connected through the lead wire 122 to lead wire 58 and the right front signaling lamp 60. Thus the pulsating signal which has been transmitted to the right rear signaling lamp 116 is also transmitted to the right front signaling lamp 60.

In a similar manner, when the driver desires to signal a left turn, the insulating plate 98 is shifted to the left by the turn selector so that an energization path runs from the central input contact 92 through the connector link 96 to the left rear signaling lamp 112 through the output contact 106 and the lead wire 110, and to the left front signaling lamp 64 through the contact 120, the lead wire 124 and the lead wire 62.

It will be recalled that when the insulating plate 98 is shifted to the right or left, the bridge 100 breaks with, respectively, the output contact 102 or the ouput contact 106. The steady energization path for the indicator lamp 76, as has been mentioned, runs to the central input contact 104 and (when the directional switch is in its "neutral" position) through both of the rear signaling lamps 112, 114. When the insulating plate 98 is shifted to either side so as, for example, to flash a left turn signal, shifting of the bridge 100 opens the connection between the contacts 104 and 106 so that said energization path must b completed (if at all) through the right rear signaling lamp 116. Thus, if the filament of the right rear signaling lamp 116 is intact, i.e. if said lamp is operable, the indicator lamp 76 continues to burn in its steadily illuminated condition. If, however, the right rear signal lamp 116 has burned out, the energization path for the indicator lamp 76 will be open (not grounded due to the break in the filament) and the indicator lamp will be extinguished. In a similar manner when the directional switch is operated to indicate a right turn, the indicator lamp 76 will continue its steady burning condition only if the left rear signaling lamp 112 is illuminatable and the indicator lamp will be extinguished if said left rear signaling lamp has burned out. Thus, by watching the indicator lamp when signaling either a right turn or left turn, the driver will know by a change in the indicator lamp from a steady burning condition to an unlit condition that the rear signaling lamp opposed to the signaling lamp which is being flashed, is defective.

It thus will be seen that I have provided a device which achieves the several objects of my invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention I claim as new and useful and desire to secure by Letters Patent:

1. In a vehicle signaling system for an automobile having right and left front and rear signaling lamps, a source of electrical energy, an ignition switch movable between an "open" position and a "closed" position, a hazard switch having a first section and a second section jointly movable between a "hazard on" position and a "hazard off" position, a flasher and an indicator lamp observable in the interior of the automobile, said indicator lamp having a resistance that is high relative to the resistance of the rear signaling lamps:

(a) circuit means
    (i) connecting the source of electrical energy, the ignition switch in "closed" position, the first section of the hazard switch in "hazard off" position and the indicator lamp in series with one another and in series with the rear signaling lamps, and (ii) connecting the rear signaling lamps in parallel with one another (iii) so that when the ignition switch is in "closed" position and the hazard switch is in "hazard off" position, the indicator lamp due to its high resistance will burn steadily and the rear signaling lamps due to their low resistances will not burn, (iv) the steady burning of the indicator lamp showing that an electrical path through at least one of the rear signaling lamps has been closed and that said rear signaling lamp is operable, and (b) other circuit means (i) connecting the source of electrical energy, the flasher and the second section of the hazard switch in "hazard on" position in series with one another and in series with the right and left front and rear signaling lamps, (ii) connecting said signaling lamps in parallel with one another, and (iii) connecting the second section of the hazard warning switch in "hazard on" position in series with the indicator lamp and the first section of the hazard switch, (iv) said last-named series connection thereby connecting the indicator lamp in parallel with the right and left front and rear signaling lamps (v) so that when the hazard switch is in "hazard on" position and regardless of the position of the ignition switch, the indicator lamp will flash and the right and left front and rear signaling lamps will flash.

2. A vehicle signaling system as set forth in claim 1 which further includes a brake pedal and a stop light switch movable from an "open" position to a "closed" position by depression of the pedal and back to the "open" position upon release of the pedal, wherein the system further comprises shunting circuit means connecting the stop light switch across the indicator lamp, the first section of the hazard switch and the ignition switch when the brake pedal is depressed and the stop light switch is thereby brought to "closed" position, the shunting of the indicator lamp, the first section of the hazard switch and the ignition switch closing a series connection from the source of electrical energy directly to the rear signaling lamps, so that when the brake is depressed with the hazard switch in "hazard off" position, the rear signaling lamps will burn steadily and the immediately previously steadily burning indicator lamp will be extinguished showing that the stop light switch has closed and at least one of the rear signaling lamps is burning.

3. A vehicle signaling system as set forth in claim 1 which includes a second flasher and a turn signal switch movable between a "neutral" position, a "right turn" position and a "left turn" position, wherein the system further comprises turn-flashing circuit means, the turn-flashing circuit means (i) constituting an open connection between the source of electrical energy and the signaling lamps when the turn signal switch is in its "neutral" position, (ii) connecting the source of electrical energy, the ignition switch in "closed" position, the second flasher and the turn signal switch in series with one another, (a) connecting said series connection in series only with the right front and rear signaling lamps and connecting said right signaling lamps in parallel with one another when the turn signal switch is in "right turn" position so that when said turn signal switch is in "right turn" position and the ignition switch is closed only the right signaling lamps will flash, and (b) connecting said series connection in series only with the left front and rear signaling lamps and connecting said left signaling lamps in parallel with one another when the turn signal switch is in "left turn" position so that when said turn signal switch is in "left turn" position and the ignition switch is closed only the left signaling lamps will flash, (iii) the movement of the turn signal switch to its "right turn" position opening the path of the first named circuit means to the right rear signaling lamp but leaving closed the path of the first named circuit means to the left rear signaling lamp so that when the turn signal switch is in its "right turn" position and the hazard switch is in "hazard off" position, steady burning of the indicator lamp shows that an electrical path through the left rear signaling lamp has been closed and that said left rear signaling lamp is operable, (iv) the movement of the turn signal switch to its "left turn" position opening the path of the first named circuit means to the left rear signaling lamp but leaving closed the path of the first named circuit means to the right rear signaling lamp so that when the turn signal switch is in its "left turn" position and the hazard switch is in its "hazard off" position, steady burning of the indicator lamp shows that an electrical path through the right rear signaling lamp has been closed and that said right rear signaling lamp is operable.

4. A vehicle signaling system as set forth in claim 3 which further includes a brake pedal and a stop light switch movable from an "open" position to a "closed" position by depression of the pedal and back to the "open" position upon release of the pedal, wherein the system further comprises shunting circuit means connecting the stop light switch across the indicator lamp, the first section of the hazard switch and the ignition switch when the brake pedal is depressed and the stop light switch is thereby brought to "closed" position, the shunting of the indicator lamp, the first section of the hazard switch and the ignition switch closing a series connection from the source of electrical energy directly to the rear signaling lamps, so that when the brake is depressed with the hazard switch in "hazard off" position, the rear signaling lamps will burn steadily and the immediately previously steadily burning indicator lamp will be extinguished showing that the stop light switch has closed and at least one of the rear signaling lamps is burning.

5. A vehicle signaling system as set forth in claim 1 wherein the first section of the hazard warning switch includes a first contact, a second contact and a third contact, the first contact being connected to the indicator lamp, the second contact being connected to the ignition switch and the third contact being connected to the source of electrical energy, the first section connecting the first contact to the second contact in series with the rear signaling lamps in the "hazard off" position of the hazard warning switch and the first section connecting the first contact to the third contact in parallel with the front and rear signaling lamps in the "hazard on" position of the hazard warning switch.

References Cited by the Examiner

UNITED STATES PATENTS 2,486,599   11/1949   Hollins.
3,165,716   1/1965    Epstein _____ 340—81

NEIL C. READ, *Primary Examiner.*

I. J. LEVIN, *Assistant Examiner.*